: 3,061,582
ETHYLENIC MODIFICATION OF BRANCHED CHAIN POLYAMIDES

Charles E. Frank and Stanley P. Rowland, Cincinnati, Ohio, assignors to National Distillers and Chemical Corporation, New York, N.Y., a corporation of Virginia
No Drawing. Filed July 9, 1959, Ser. No. 825,894
14 Claims. (Cl. 260—45.5)

This invention relates to novel chemical derivatives of synthetic linear polyamides and to processes for producing the same. More particularly, the invention pertains to treatment of certain polyamides with specific modifying compounds.

The polyamides used for preparation of the novel products herein described may be prepared by reacting a diamine with dicarboxylic acid reactants or an amide-forming derivative of said dicarboxylic acid reactants, the reaction being carried out under condensation-polymerization conditions until polyamides of relatively high molecular weight are produced.

The diamine reactant is characterized by having at least one hydrogen atom attached to each nitrogen atom. Suitable diamines include the primary diamines. Aliphatic diamines are preferred, such amines being characterized by having the nitrogen atoms attached to aliphatic carbon atoms. More preferably, the aliphatic diamines contemplated for usage are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, dodecamethylene diamine, 1,6-diaminooctane, 3,6-diaminooctane, 2-ethyl-1,8-diaminooctane, 2,5-diethyl-1,6-diaminohexane, and the like. Structurally, diamines suitable for practice of this invention may be defined as having the formula, $NH_2RNH_2$ in which R is a divalent hydrocarbon radical free from olefinic and acetylenic unsaturation and which has a chain length of at least four carbon atoms. Although such amines in which R is an aliphatic chain are preferred, diamines of the aforesaid structural formula in which R may be alicyclic, aromatic or arylaliphatic and in which the amino groups are attached to aliphatic carbon atoms, are also contemplated.

The dicarboxylic acid reactant comprises isomeric, branched chain $C_{10}$ aliphatic dicarboxylic acids, and mixtures thereof with aliphatic dicarboxylic acid such as sebacic, adipic, and azelaic, the branched chain dicarboxylic acids, and especially a mixture of such $C_{10}$ dicarboxylic acids made up from and including substantial amounts and major proportions of 2-ethylsuberic and 2,5-diethyladipic acids. These branched chain $C_{10}$ dicarboxylic acids and mixtures thereof are preferably, but not necessarily, obtained as mixtures and by the method disclosed in U.S. Patent No. 2,816,916. Thus, the polyamides to which the invention relates may be prepared by reaction between a suitable diamine and one or more branched chain $C_{10}$ dicarboxylic acids having at least one $C_2$ branch per molecule. Preferred mixtures of aliphatic $C_{10}$ dicarboxylic acids comprise a major proportion of the branched chain dicarboxylic acids and, more specifically, about 5–45% sebacic acid, about 50–60% 2-ethylsuberic acid, and about 5–15% 2,5-diethyladipic acid. Removal of a portion of the sebacic acid produces an isomeric mixture of $C_{10}$ aliphatic dicarboxylic acids containing about 72–80% 2-ethylsuberic acid, about 10–20% of 2,5-diethyladipic acid, and the remainder, about 5–15%, substantially sebacic acid. The polyamide feed material as embodied herein are prepared by subjecting a suitable diamine and the appropriate dicarboxylic acid reactants to amidation or transamidation reaction conditions with elimination of water or other by-products formed by the reaction. In accordance with the preferred method of this invention, the polyamides will be prepared from 2-ethylsuberic acid, 2,5-diethyladipic acid and mixtures thereof. It will be understood, however, that minor amounts of sebacic, adipic, and/or azelaic acid may be present in the dicarboxylic acid feed; and, furthermore, that the use of the total mixture of $C_{10}$ dicarboxylic acids prepared by the process of U.S. Patent No. 2,816,916 is contemplated. Thus, the polyamides used in the process of this invention are characterized by containing a plurality of units of the following structure:

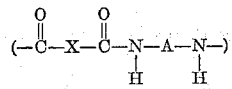

in which X is a hydrocarbon portion of a saturated aliphatic dicarboxylic acid having from about 6 to 10 carbon atoms per molecule, and A is a hydrocarbon portion of a diamine; said polyamides being further characterized in that the major proportion of such units of the aforesaid polyamide structure are such that X is the hydrocarbon portion of a $C_{10}$ saturated aliphatic dicarboxylic acid containing at least one $C_2$ branch chain per molecule.

The polyamides embodied herein can be prepared by heating in substantially equimolecular amounts a suitable diamine and the dicarboxylic acid reactant under condensation-polymerization conditions, generally from about 180° to about 300° C., in the presence or absence of a diluent, until relatively high molecular weight linear condensation polyamides are obtained and, preferably, until the polyamide possesses fiber-forming properties. The preparation of polyamides may be carried out in any of several ways. For example, the diamine and dicarboxylic acid reactant may be intimately mixed in proper proportions and the mixture subjected to condensation-polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid compoent or components. For such preparations, use is contemplated of amide-forming derivatives of the branched chain $C_{10}$ dicarboxylic acids, and/or of other dicarboxylic acids used in admixture therewith, such amide-forming derivatives including anhydrides, amides, acid halides, half-esters and diesters which are known to form amides when reacted with a primary or secondary amine. Specific amide-forming derivatives contemplated for use herein include esters of the branched chain $C_{10}$ dicarboxylic acids, illustrative of which are the diethyl and dimethyl esters of 2-ethylsuberic acid and of 2,5-diethyladipic acid and mixtures thereof. The reactions are carried out under a blanket of dry oxyen-free nitrogen at both atmospheric and sub-atmospheric pressures and under suitable reaction temperatures by provision of constant temperature conditions. It will be understood, however, that the exact method of preparing the polyamides is not an essential feature of the present invention.

Examples of specific polyamides to be treated in accordance with the process of this invention include polyhexamethylene 2-ethylsuberamide, polyhexamethylene 2,5-diethyladipamide, and copolyamides derived from, for example, the total $C_{10}$ dicarboxylic acid mixture described above. These polyamides exhibit relatively low softening points (i.e., below 150° C.), together with relatively high solubility in polar solvents. It is well known in the field of polymer chemistry and particularly in the field of polyamides that these two properties go hand in hand: i.e., good solubility is limited to those polyamides having relatively low softening points. These polyamides have a number of practical uses; however, even greater utility would be realized if these polyamides when applied from solution would exhibit elevated softening points and resistance to solvents. It would be advantageous, therefore, to be able to alter these properties of the polyamide subsequent to the application operation in which the polyamide is dissolved in the appropriate solvent.

One object of this invention is to modify the aforementioned polyamides so as to enhance their utility. Another object is to improve their resistance to solvents. A further object is to improve such properties as softening point, hardness, flexibility, and the like. Further objects and advantages of the present invention will appear from the more detailed description set forth below.

In accordance with the present invention, these objects may be accomplished by treating the polyamides with ethylenic compounds selected from the group consisting of divinyl benzene, diallyl phthalate, polyethylene glycol dimethacrylate, and polyethylene glycol diacrylate. The exact mechanism involved in the treatment is not completely understood although it is believed a reaction occurs between the polyamide and the modifier. This appears to be borne out by the fact that the use of a nonreactive material such as a simple aromatic hydrocarbon in place of the reactive hydrocarbon (i.e., divinyl benzene) does not provide any modification or improvement in the properties of the polyamide.

The modified polyamides embodied herein may be prepared by heating in suitable amounts the polyamide and the modifier, generally from about 80° C. to about 200° C., with or without a catalyst, until modified polyamide products with appreciably higher softening points and/or improved solvent resistance are obtained. In one manner of carrying out the reaction, the proper proportions of polyamide, modifier, and catalyst (when employed) are first intimately mixed. Contact of the reactants may be facilitated by employing the polyamide in a finely divided form, such as may be obtained by controlled precipitation from a solvent or by efficient mechanical milling. Intimate contact of the reactants may also be facilitated by compaction under pressure of the reactant mixture prior to and/or during the heating step. The modification reaction is carried out by submitting the intimate mixture of reactants to one or more heating steps in a suitable reaction vessel. As mentioned before, pressure may be applied during the reaction. In another method of carrying out the reaction, the polyamide together with modifier and catalyst may be dissolved in a suitable solvent such as ethanol, ethanol-water butanol, etc. The reaction may be carried out in solution, although it is more desirable and appropriate to employ the solution simply as a means for applying the combination of polyamide and modifier in the homogeneous form such as, for example, a film applied on paper, cloth, plastic or metal. Following deposition of such a film, it is preferred to allow the solvent to evaporate and subsequently to cause the reaction with the modifier to take place. This reaction may be facilitated in actual practice by a baking operation conducted at temperatures ranging from about 20° to 300° C. for periods of time which are adequate to develop the desired properties.

The function of a heating step is twofold: it causes the reaction between the polyamide and the modifier to take place and it effects the volatilization of unreacted modifier. To facilitate the latter, provision should be made to allow the escape of volatiles from the reaction zone. One method of operation involves venting the reaction vessel after the desired amount of modifier has been reacted. The extent of reaction may be determined by routine experiment. It is dependent upon such factors as the ratio of modifier to polyamide, the particular modifier used, and the degree of modification desired. Another method by which volatiles may be removed, and in some cases further reaction enhanced, involves conditioning in an oven, preferably of the air circulating type, of unconfined modified polyamide products at temperatures below their softening points.

The elevated temperatures which may be used in carrying out the reaction may vary from about 80° C. to about 300° C., although the upper temperature is not critical as long as it is below the decomposition temperature of the reactants and the desired products. Below 80° C. the reaction may be too slow depending upon the nature of the modifier and the particular catalyst chosen for this system. Above 200° C. the loss of modifier may be inordinately large and side reactions may occur. The curing operation, therefore, must be adjusted to the choice of modifier and catalyst which is being employed. In a closed system, temperatures up to about 300° C. could be employed before degradation of the polymer would become excessive. It is preferred to carry out the reaction between about 100° C. and 175° C. If a subsequent conditioning of the unconfined modified polyamide is employed, the temperature during this conditioning may range from room temperature up to the softening point of the particular modified polyamide. A preferred range is from about 60° C. to about 10° C. below the softening point of the modified polyamide.

The time required for reaction and conditioning to produce the desired improvement in properties for a polyamide modified by a selected proportion of a particular ethylenic compound may be determined by routine experiment. Substantial improvement in properties has been observed after as little as 20 minutes' reaction time. Maximum improvement may take as long as six hours to achieve. It will be understood, however, that the required time period can readily be determined by routine exeprimentation.

As little as 0.1 part of modifier added to one part of polyamide produces surprising and substantial improvements in solvent resistance. It is preferred to add from about 0.1 to 0.3 part of the ethylenic compound to one part of the polyamide. While the addition of greater portions of modifier will not be deleterious per se for improving the softening point and solvent resistance, little or no beneficial effect is observed when the modifier is employed beyond the limits of about 0.4 part per part of polyamide.

Catalysts suitable for use in this invention are of the free radical type. Examples are benzoyl peroxide, ditertiarybutyl peroxide, acetyl peroxide, $\alpha,\alpha'$-azodiisobutyronitrile, and the like. A concentration of catalyst in a range of 0.4 to 3 percent by weight, based on the divinyl compound, is preferred where catalyst is necessary. The desired amount of catalyst may be premixed with the polyamide and modifier or it may be added to the mixture of polyamide and modifier. However, catalyst should not be contacted with the modifier in the absence of polyamide due to the tendency of the catalyst to induce homopolymerization of such compounds.

The aforedescribed reactions for preparing modified polyamides may be carried out in a batchwise, semi-continuous, or continuous manner and it is not intended to limit the process to any particular method of operation.

The herein described modified polyamides are useful for application as components or major constituents of special film-forming compositions for protective and/or decorative purposes. They also find use in plastic compositions extrudable into tubing or various shapes or moldable into housewares, gears, and the like.

The softening point and complete melt point referred to by this invention are defined in accordance with the following apparatus and procedure:

A Fisher-Johns melting point apparatus was supplemented with a vertical support holding a section of copper tubing which served as a guide for a 9 inch steel rod. A sample of the polyamide disc (approx. 0.01 in. thick) was trimmed until about 1 mm. on a side and placed in a cover glass on the hot stage at room temperature. Another cover glass was placed on top of the sample; the steel rod was lowered onto the surface and centered and balanced so that there was free motion with deformation. A micrometer dial gauge, reading to .0005, and held in a clamp mounted onto the support was lowered onto the top of the steel rod until the dial was deflected about midway. The constant weight of the sample consisted of the weight of the steel rod and the spring tension of the gauge; it totaled 80 p.s.i. against the sample. The heat was controlled manually so as to produce a slow and fairly constant rate of rise of temperature from room temperature to as high as 300° C. Notations were made of dial readings at frequent intervals as the temperature rose, and a graph was plotted with gauge deflection in .001 in. along the ordinant and temperature in ° C. along the abscissa. The initial portion of the curve which sloped upward was due to the expansion of the steel rod. At the point where the curve exhibited a change in slope, the corresponding temperature was recorded as the "softening point." When the sample melted to the liquid the expansion of the liquid caused a change in sign of the slope of the curve. The corresponding temperature was recorded as the "complete melt point."

In order to further describe the invention, the following specific embodiments are set forth in which all parts are expressed by weight. These examples and embodiments are illustrative only, and the invention is not in any way intended to be limited specifically thereto except as indicated by the appended claims.

EXAMPLE I

The polyamide feed material used in runs 1 through 6 to illustrate embodiments of this invention was prepared in the following manner:

181 g. of 2-ethylsuberic acid was dissolved in 1500 ml. of absolute ether. This solution was then placed in an ice bath, and 261.6 ml. of a methanolic solution containing 103.1 g. of hexamethylene diamine was added dropwise with stirring. The resulting crystalline salt precipitate was collected by filtration and washed with three volumes of ether.

263 g. of the salt was charged to a glass polymerization tube along with 29.45 ml. of a methanolic solution of hexamethylene diamine prepared in the same manner as that described above. The tube was covered with aluminum foil and inserted into a pressure bomb. The bomb was flushed with nitrogen and at the same time warmed to distill off the methanol from the salt mixture. Following this, the bomb was sealed and the temperature gradually raised to 282° C. by means of methyl phthalate vapor. This temperature was maintained for about four hours. Pressure was maintained at 250 to 500 p.s.i. by bleeding off vapor. The bomb was then depressurized and the pressure gradually reduced to about 0.5 mm. After about six hours of heating at 282° C. under vacuum, the bomb was cooled, then brought to atmospheric pressure under a nitrogen blanket. The polymer was removed by breaking away the glass of the polymerization tube.

The polyamide obtained exhibited the following properties:

| Melt point, ° C. | | Mol. weight | Intrinsic viscosity | Tensile strength | |
|---|---|---|---|---|---|
| Softening point | Complete melt | | | Ultimate | Percent elongation |
| 40 | 180 | 23,100 | 1.135 | 6,900 | 210 |

*Run 1.*—Approximately 4 g. of the unmodified polyamide was pulverized in a laboratory Willey mill, and then charged to the mold of a Carver laboratory hydraulic press. The temperature of the face plates of the press was regulated by electrical heating and water cooling, and measured by means of a thermometer well in the lower plate. The mold was closed and placed between the face plates. A pressure of about 400 p.s.i. was applied to compress the sample. A pressure of 8000 p.s.i. was then applied and maintained while the temperature of the mold was raised over a period of about 15 minutes to approximately 93° C. (200° F.), held there for 25 minutes, and allowed to return to room temperature over an additional 10 to 15 minutes. Hereafter, this step, which comprises the fusion of the confined mixture of reactants at elevated temperatures, will be referred to as a fusion reaction step. The molded plastic disc was removed from the mold, placed in a forced air oven, and heated over a period of 180 minutes at 70° C. Hereafter this step, which comprises heating the unconfined product, will be referred to as the conditioning step. The finished disc was hazy and slightly flexible. A piece of the unconditioned disc was placed in a jar and immersed in 10 ml. of ethanol. The jar was sealed, and then stored for 24 hours in an oven regulated to 70° C. At the end of this time, the polyamide had dissolved completely, producing a clear, colorless solution. In a similar test run in concentrated hydrochloric acid for 24 hours at room temperature (about 20° C.) the polyamide completely dissolved to yield a clear, colorless solution. On another portion of the plastic disc, a softening point of 52° C. and a complete melt point of 170° C. were determined by means of the aforedescribed apparatus and technique. Thus, within the limits of experimental error, the properties of the subject polyamide remained unchanged upon submission to the above described treatment. The reaction conditions and properties of the treated unmodified polyamide as well as those of subsequent modified polyamides are presented in the table.

*Run 2.*—Approximately 4 g. of the unmodified polyamide was pulverized and then thoroughly mixed with 0.24 g. of $\alpha,\alpha'$-azodiisobutyronitrile. The mixture was subjected to the same treatment as used for run 1 except that the fusion reaction was carried out for 110 minutes at 120° C. The resulting products exhibited properties substantially unchanged from those of either the untreated or treated unmodified polyamides. Consequently, a free radical catalyst in the absence of a modifier produces no improvement in the subject polyamides.

*Run 3.*—6.6 parts of the unmodified polyamide was pulverized and then intimately mixed with one part of diallyl phthalate. 0.03 part of $\alpha,\alpha'$-azodiisobutyronitrile was added and uniformly distributed in the mixture by further agitation. The resulting mixture was subjected to the same treatment as used for run 1 except that 1000 p.s.i. was applied during the fusion reaction step, the fusion reaction was carried out for 60 minutes at 155° C., and the conditioning step was omitted. A sample of the resulting modified polyamide product exhibited a decrease in the complete melt point, however, it was insoluble in either ethanol or concentrated HCl. The modified polyamide was also softer and more flexible than the unmodified starting polymer.

*Run 4.*—5.0 parts of the unmodified polyamide was pulverized and then intimately mixed with one part of divinyl benzene. 0.004 part of benzoyl peroxide was added and uniformly distributed in the mixture by further agitation. The resulting mixture was subjected to the same treatment as used for run 1 except that no pressure was applied during the fusion reaction step and the fusion reaction was carried out for 70 minutes at 107° C. The modified polyamide after the fusion reaction exhibited substantial improvement in solvent resistance, and was softer and more flexible. The softening and complete melt points showed little change. However, the conditioning step produced a large increase in softening point.

*Run 5.*—4.1 parts of the unmodified polyamide was pulverized and then intimately mixed with one part of polyethylene glycol dimethacrylate. About 0.014 part of ditertiarybutyl peroxide was added and uniformly distributed in the mixture by further agitation. The resulting mixture was subjected to the same treatment as used for run 1 except that 1000 p.s.i. was applied during the fusion reaction step, the fusion reaction was carried out for 40 minutes at 130° C. and the conditioning step was carried out for 240 minutes at 70° C. The modified polyamide product exhibited large improvement in solvent resistance, and was harder and less flexible than the unmodified polymer.

*Run 6.*—5.1 parts of the unmodified polyamide was pulverized and then intimately mixed with one part of polyethylene glycol diacrylate. About 0.03 part of ditertiarybutyl peroxide was added and uniformly distributed in the mixture by further agitation. The resulting mixture was subjected to the same treatment as used for run 5 except that the fusion reaction was carried out for 60 minutes at 149° C. The modified polyamide product exhibited large improvement in solvent resistance, and was softer and more flexible than the unmodified polymer.

the ratio of approximately 65/35. The polymer exhibited an intrinsic viscosity (in 90% formic acid) of 1.26 and had a softening point at 140° C. 100 grams of this polyamide was combined with 20 grams of diallyl phthalate and 0.2 gram of t-butyl perbenzoate in Z-blade mixer under an inert gas atmosphere. The mixer was sealed and mixing was conducted for a period of 2 hours. The powder product was then placed on the rolls of a rubber mill, and the resulting sheet was compression molded into a 100-mill slab at 300° F. The molded slab exhibited greater flexibility than the unmodified polyamide, and it exhibited a substantial insolubility in all solvents as compared to the solubility of the unmodified polyamide in polar solvents such as ethanol and hydrochloric acid.

EXAMPLE IV

Seven and one-half grams of the polyamide described in Example II was dissolved in ethanol to form a solution of approximately 8% concentration. Two grams of polyethylene glycol dimethacrylate together with 0.02 gram of di-t-butyl peroxide were added to the solution of polyamide. This homogeneous solution was cast in films on glass plates, wood and steel. In each case the solvent was allowed to evaporate prior to baking the sample at

*Table*

| | Runs | | | | | |
|---|---|---|---|---|---|---|
| | 1 | 2 | 3 | 4 | 5 | 6 |
| Modifier | None | None | Diallyl phthalate | Divinyl benzene | Polyethylene glycol dimethacrylate | Polyethylene glycol diacrylate |
| Reaction conditions polyamide/modifier (in product) | | | 6.6 | 5.0 | 4.1 | 5.1 |
| Catalyst | None | $\alpha,\alpha'$-azodiisobutyronitrile | $\alpha,\alpha'$-azodiisobutyronitrile | Benzyl peroxide | Di-tert. butyl perox. | Di-tert. butyl perox. |
| Fusion step | 25' at 93° C | 110' at 120° C | 60' at 155° C | 70' at 107° C | 40' at 130° C | 60' at 149° C |
| Conditioning step | 180' at 70° C | 180' at 70° C | None | 180' at 70° C | 240' at 70° C | 240' at 70° C |
| PROPERTIES OF PRODUCT AFTER FUSION | | | | | | |
| Softening pt., ° C | 52 | 26 | <40 | <40 | 48 | 35 |
| Complete melt pt., ° C | 170 | 164 | 144 | 160 | 224 | 148 |
| Sol. in ethanol | V.S. | V.S. | I | V. Sl. S. | V. Sl. S. | V. Sl. S. |
| Sol. in conc. HCl | V.S. | V.S. | I | V. Sl. S. | V. Sl. S. | V. Sl. S. |
| AFTER CONDITIONING | | | | | | |
| Softening pt., ° C | 50 | 41 | | 105 | 39 | 40 |
| Complete melt pt., ° C | 190 | 192 | | 166 | 185 | 150 |
| Hardness | Sward 32 | Sward 32 | Softer | Softer | Harder | Softer |
| Flexibility | Slight | Slight | More flexible | More flexible | Less flexible | More flexible |

EXAMPLE II

A polymer was prepared by standard amidification techniques from hexamethylenediamine and $C_{10}$ dicarboxylic acids having the following compositions: 75% of 2-ethylsuberic acid, 15% of sebacic acid and 12% of 2,5-diethyladipic acid. The polyamide exhibited an intrinsic viscosity of 1.27 (in 90% formic acid), softened over a wide range of temperatures beginning around 31° C. and reached a total melt at approximately 180° C. Fifty parts of this polyamide was combined with 10 parts of divinyl benzene in a laboratory Z-blade mixer. Following a flush with nitrogen, 0.1 part of benzoyl peroxide was introduced. The mixer was closed, and the temperature of the reaction mixture was raised to 200° F. After a 30-minute period of heating with continual mixing, the granulated product was removed and pressed into a disc ¼ in. thick by 1 in. in diameter at a temperature of 150° C., which was allowed to cool slowly to room temperature. The product exhibited an initial softening point of 111° C. with complete melting at 170° C. The product was substantially insoluble in ethanol in comparison to the complete solubility for the polyamide feed material.

EXAMPLE III

A copolyamide was prepared from hexamethylene diamine together with 2-ethylsuberic acid and adipic acid in 250° F. for 30 minutes. The film prepared on glass was characterized in comparison to one produced from the unmodified polyamide; the modified polyamide exhibited superior hardness (Sward hardness of 45 vs. 32), and improved resistance to solvents (e.g., insoluble rather than soluble in ethanol). In addition, the modified polyamide exhibited very attractive adhesion properties.

EXAMPLE V

A polyhexamethylene amide was prepared from the mixture of dicarboxylic acids composed of 2-ethylsuberic, 2,5-diethyladipic, sebacic and adipic acids in the weight ratio 50/10/5/35. Following dissolution in ethanol, the product was combined with 0.25 part of polyethylene glycol diacrylate and 0.0025 part of t-butylperbenzoate for each part of polyamide. The clear and homogeneous solution was cast on a tin plate and allowed to air-dry overnight; the film was then subjected to a bake at 250° F. for 1 hour. Films from the modified polyamide exhibited superior impact resistance, flexibility and solvent resistance.

While particular embodiments of this invention are shown above, it will be understood that the invention is obviously subject to variations and modifications without departing from its broader aspects.

What is claimed is:

1. A process for improving the properties of a polyamide prepared by reacting (a) a dicarboxylic acid selected from the group consisting of branched chain $C_{10}$ saturated aliphatic acids and mixtures thereof with straight chain $C_6$ to $C_{10}$ saturated aliphatic acids with (b) a diamine having at least one hydrogen atom attached to each nitrogen atom which comprises reacting said polyamide at a temperature between about 80° and 300° C. with an ethylenic compound selected from the group consisting of divinyl benzene, diallyl phthalate, polyethylene glycol dimethacrylate, and polyethylene glycol diacrylate in the presence of an added free radical polymerization catalyst, the amount of said ethylenic compound being in the range of about 0.1 to 0.4 part per part of said polyamide.

2. The process of claim 1 wherein said dicarboxylic acid is 2-ethylsuberic acid.

3. The process of claim 1 wherein said dicarboxylic acid is a mixture of 2-ethylsuberic acid and adipic acid.

4. The process of claim 1 wherein said dicarboxylic acid is a mixture of 2-ethylsuberic acid, 2,5-diethyladipic acid and sebacic acid.

5. The process of claim 4 wherein said mixture also contains adipic acid.

6. The process of claim 1 wherein said ethylenic compound is divinyl benzene.

7. The process of claim 1 wherein said ethylenic compound is diallyl phthalate.

8. The process of claim 1 wherein said ethylenic compound is polyethylene glycol dimethacrylate.

9. The process of claim 1 wherein said ethylenic compound is polyethylene glycol diacrylate.

10. The product obtained by reacting at about 80° to 300° C. in the presence of an added free radical polymerization catalyst (1) a polyamide prepared by reacting (a) a dicarboxylic acid selected from the group consisting of branched chain $C_{10}$ saturated aliphatic acids and mixtures thereof with straight chain $C_6$ to $C_{10}$ saturated aliphatic acids with (b) a diamine having at least one hydrogen atom attached to each nitrogen atom with (2) an ethylenic compound selected from the group consisting of divinyl benzene, diallyl phthalate, polyethylene glycol dimethacrylate, and polyethylene glycol diacrylate, the amount of said ethylenic compound being in the range of about 0.1 to 0.4 part per part of said polyamide.

11. The product of claim 10 wherein said ethylenic compound is divinyl benzene.

12. The product of claim 10 wherein said ethylenic compound is diallyl phthalate.

13. The product of claim 10 wherein said ethylenic compound is polyethylene glycol dimethacrylate.

14. The product of claim 10 wherein said ethylenic compound is polyethylene glycol diacrylate.

References Cited in the file of this patent

UNITED STATES PATENTS

| | | |
|---|---|---|
| 2,155,590 | Garvey | Apr. 25, 1939 |
| 2,539,438 | Kropa et al. | Jan. 30, 1951 |
| 2,816,916 | Frank et al. | Dec. 17, 1957 |

FOREIGN PATENTS

| | | |
|---|---|---|
| 679,562 | Great Britain | Sept. 17, 1952 |